US010891635B2

(12) United States Patent
Montoya (10) Patent No.: US 10,891,635 B2
(45) Date of Patent: Jan. 12, 2021

(54) SYSTEMS AND METHODS FOR PROVIDING A DYNAMIC SURVEY AND COLLECTING AND DISTRIBUTING DYNAMIC SURVEY INFORMATION

(71) Applicant: Patrick Montoya, Ann Arbor, MI (US)

(72) Inventor: Patrick Montoya, Ann Arbor, MI (US)

( * ) Notice: Subject to any disclaimer, the term of this patent is extended or adjusted under 35 U.S.C. 154(b) by 677 days.

(21) Appl. No.: 15/258,101

(22) Filed: Sep. 7, 2016

(65) Prior Publication Data

US 2017/0068967 A1    Mar. 9, 2017

Related U.S. Application Data

(60) Provisional application No. 62/215,155, filed on Sep. 7, 2015.

(51) Int. Cl.
*G06Q 30/02* (2012.01)

(52) U.S. Cl.
CPC ..... *G06Q 30/0201* (2013.01); *G06Q 30/0203* (2013.01)

(58) Field of Classification Search
CPC ............ G06Q 30/02; G06Q 30/0201; G06Q 30/0245; G06Q 30/0203; G06Q 30/0217
USPC ...................................... 705/7.32
See application file for complete search history.

(56) References Cited

U.S. PATENT DOCUMENTS

| 7,539,696 | B1 | 5/2009 | Greener et al. |
| 2002/0046120 | A1 | 4/2002 | Collins et al. |
| 2002/0128898 | A1* | 9/2002 | Smith, Jr. ............... G06Q 10/06 705/7.32 |
| 2002/0152092 | A1* | 10/2002 | Bibas ...................... G06Q 30/02 705/316 |
| 2002/0188511 | A1 | 12/2002 | Johnson et al. |
| 2003/0232245 | A1* | 12/2003 | Turak ........................ G09B 7/00 429/231.95 |
| 2005/0273804 | A1 | 12/2005 | Preisman |
| 2006/0117388 | A1* | 6/2006 | Nelson ................... G06F 21/577 726/25 |
| 2008/0288276 | A1* | 11/2008 | Harris ..................... G06Q 30/02 705/7.32 |
| 2008/0296370 | A1 | 12/2008 | Khandelwal et al. |
| 2009/0281871 | A1 | 11/2009 | Tietzen et al. |
| 2009/0287642 | A1* | 11/2009 | Poteet ..................... G06Q 30/02 |
| 2009/0313067 | A1 | 12/2009 | Costa et al. |

(Continued)

FOREIGN PATENT DOCUMENTS

| JP | 2009187524 A | 8/2009 |
| JP | 2016524258 A | 8/2016 |

*Primary Examiner* — Johnna R Loftis
(74) *Attorney, Agent, or Firm* — Vivacqua Crane (57) ABSTRACT

Systems and methods for providing a dynamic survey, and collecting and distributing dynamic survey information are disclosed. A method includes providing one or more survey questions, where each survey question corresponds to a plurality of selectable response options, receiving a modification of at least one of the selectable response options, where the modification corresponds to an answer that more accurately reflects an opinion of a respondent than the selectable response options, searching a database for additional modifications to the selectable response options, and when the modification matches an existing modification from the additional modifications, logging the modification in the database as an additional modification.

20 Claims, 5 Drawing Sheets

(56) References Cited

U.S. PATENT DOCUMENTS

| | | |
|---|---|---|
| 2011/0093528 A1 | 4/2011 | Ahamed et al. |
| 2011/0257961 A1* | 10/2011 | Tinkler .................... G09B 7/06 704/9 |
| 2014/0229204 A1 | 8/2014 | Huynh et al. |
| 2017/0032028 A1* | 2/2017 | Joi ......................... G06F 16/338 |
| 2017/0132313 A1* | 5/2017 | Kukla ................... G06F 16/334 |

* cited by examiner

SYSTEMS AND METHODS FOR PROVIDING A DYNAMIC SURVEY AND COLLECTING AND DISTRIBUTING DYNAMIC SURVEY INFORMATION

CROSS-REFERENCE TO RELATED APPLICATION

The present application claims priority to U.S. Provisional Patent Application Ser. No. 62/215,155, filed Sep. 7, 2015 and entitled "System and Method for Collecting and Distributing Dynamic Survey Information," which is incorporated by reference herein in its entirety.

TECHNICAL FIELD

The present specification generally relates to methods, processes, and systems for generating and providing an electronic survey and receiving response data and, more particularly, to systems and methods that provide a dynamic electronic survey that is modifiable by one or more respondents such that the response data accurately reflects the one or more respondents' opinions.

BACKGROUND

Currently, surveys that are provided to individuals do not accurately reflect a user's response because the user is limited to particularly worded questions and/or a certain number of preset responses that may not accurately reflect the user's opinion.

Accordingly, a need exists for systems and methods that provide surveys that allow a user to modify a question and/or one of the preset responses to accurately reflect the user's opinion.

SUMMARY

In one embodiment, a method of providing a dynamic survey includes providing, by a processing device, one or more survey questions, where each one of the one or more survey questions corresponds to a plurality of selectable response options, receiving, by the processing device, a modification of at least one of the plurality of selectable response options, where the modification corresponds to an answer that more accurately reflects an opinion of a respondent than the at least one of the plurality of selectable response options, searching, by the processing device, a database for additional modifications to the at least one of the plurality of selectable response options, and when the modification matches an existing modification from the additional modifications, logging, by the processing device, the modification in the database as an additional one of the existing modifications.

In another embodiment, a system for providing a dynamic survey includes a processing device and a non-transitory, processor-readable storage medium. The non-transitory, processor-readable storage medium includes one or more programming instructions that, when executed, cause the processing device to provide one or more survey questions, where each one of the one or more survey questions corresponds to a plurality of selectable response options, receive a modification of at least one of the plurality of selectable response options, where the modification corresponds to an answer that more accurately reflects an opinion of a respondent than the at least one of the plurality of selectable response options, search a database for additional modifications to the at least one of the plurality of selectable response options, and when the modification matches an existing modification from the additional modifications, log the modification in the database as an additional one of the existing modifications.

In yet another embodiment, a computing system that provides a dynamic survey includes input/output hardware that receives a modification of at least one of a plurality of selectable response options, the at least one of the plurality of selectable response options corresponding to a survey question, where the modification corresponds to an answer that more accurately reflects an opinion of a respondent than the plurality of selectable response options. The computing system also includes processing logic that searches a database for additional modifications to the at least one of the plurality of selectable response options and when the modification matches an existing modification from the additional modifications, logs the modification in the database as an additional one of the existing modifications. The computing system also includes a display that displays the one or more survey questions to the respondent.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems and methods for providing one or more survey questions that are each structured in a manner so as to elicit a response from a respondent that accurately allows the respondent to express his or her opinion without being specifically limited to the plurality of response choices that are provided with each survey question. As such, the systems and methods described herein enable a respondent to modify a static survey in such a manner that the survey asks more relevant questions and/or provides more suitable options for answers that better represent the respondent's opinions, relative to a static survey that does not allow for modification of survey responses. In addition, the systems and methods described herein enable a user to find a survey result on any subject matter via a search or by conducting a new survey.

The systems and methods described herein may operate as an Internet website and/or provide functionality on a website such that a user browsing to the website can search for a survey, create a survey, view and/or download data regarding a survey, take a survey, and/or modify survey contents (e.g., modify survey questions and/or answers). The Internet may be an ideal medium for conducting surveys because a vast number of potential survey respondents that have access to the Internet through client computer systems. Surveys related to such things as automobile owner satisfaction, consumer products reviews, political issues, television program ratings, restaurant and hotel reviews, opinion polls, and/or the like can be effectively and inexpensively conducted over the Internet.

The Internet is replete with websites and apps where individuals can express their opinions by posting typed comments, but such comments may have little or no value to the general public interested in the combined opinion of a population since the comments only represent the opinion of one individual and not of a population or a specific demographic. Some websites conduct surveys on specific populations such as on the website visitors themselves, but there is little or no value of such surveys to the general public interested in survey results because the general public does not know the survey information exists (or where to find it), results may not be available to the public, the survey respondent population is limited to a specific demographic (website visitors), and the authenticity of the responses is questionable at best.

For example, some merchants or search engines may conduct "pop-up" surveys related to various subjects, such as to a user friendliness of a site (i.e. to rate the website) or perhaps political issues (i.e. who will you vote for?). However, the results of such surveys are limited in that they are biased toward the opinions of respondents who happen to be visitors of a particular website. Moreover, such surveys are not guarded against deceptive individuals that have provided multiple responses to the same survey question, thereby possibly skewing the results. In addition, survey results are not necessarily available to respondents or the general public, surveys are related to very specific subject matters, which may not have widespread interest.

Some websites may enable registered members to find reviews and to express their opinions with reviews on businesses, services, or the like such as, for example, restaurants, spas, and coffee shops. However, the potential respondent pool is limited and no method of verifying that the reviewer actually has used the product or service for which she or he is writing a review exists. Although in some instances, users must register with the site, which requires providing a valid email address for verification. However, all other personal and demographic information can be fabricated and a valid email address can be created by virtually anyone without reliable identity verification.

Other websites may enable users to post comments and access posted comments on any subject, including subjects tagged with an identifier, such as a "hashtag," (e.g., words/phrases indicated with the #symbol), which is a type of label or metadata tag which enables users to find posts regarding a particular subject. Users place the hash character (#) in front of a word or phrase within the posting. Upon searching for the hashtag, users can find all posts containing the hashtag. Unfortunately the search results will provide hundreds, if not thousands of postings matching the hashtag, which are ultimately multiple individuals' posted comments with little value to someone seeking a population's combined opinion that is structured and discernible as survey results to a particular question.

Surveys may be used to study a sampling of individuals from a population with a view towards making statistical inferences about the population being studied. For example, public opinion polls and market research surveys may use survey methodology to answer questions about a population. As such, surveys may provide important information for all kinds of relevant public information and research fields in a structured and measurable manner.

A typical survey conducted on a sample of a population may be in a questionnaire-type format, which includes one or more questions. Each of the one or more questions may be paired with a plurality of preselected choices for answers (or items) about a given subject. A user selects one of the preselected choices, which is logged with the survey results, which can then be used to statistically aggregate the responses from the sample population.

While survey results and posted comments express the opinions of individuals, the advantage of surveys over posted comments is that survey respondents are required to express their opinion in a standardized and structured manner by answering specific questions having predetermined choices such that the answers can be aggregated from multiple respondents (i.e., by demographic) into valuable information the public may use. Posted comments, on the other hand, may not be easily aggregated or combined to provide a composite response without reading each individual comment, extracting information from the comment, and combining the extracted information with other similar information extracted from other comments into a combined result.

Structured survey questions rely on closed-ended categories and choices for answers pre-selected by the surveyor. Such structured questions may require less thinking from the respondent and may generally lead to higher response rates and more accurate data. Such structured questions may also be easier for the surveyor to code and analyze. Structured questions may include, for example, a single response with nominal or ordinal categories (e.g. "From the following list please select your highest level of education"), multiple response (e.g. "From the following list of deodorants, please select any that you may have used"), scaled questions (e.g. "Humans are responsible for global warming—Strongly Agree to Strongly Disagree"), and/or the like.

While posted comments, reviews, and open ended questions may enable individuals to freely express their opinions, structured survey questions and the options provided for answers may not fully reflect a respondent's opinion on a particular survey topic. That is, a particular question may not be phrased such that the respondent is enabled to provide a frank and genuine response. For example, a survey may ask "Do you disagree with experts about global warming?" and provide "yes" and "no" options for responding. However, responding to this survey question may not reflect a respondent's complete and more nuanced opinion about this subject, as a particular respondent may believe the globe is warming but may doubt that man is responsible. As such, the respondent may find that a better question to ask in order to capture its actual opinion may be "Do you believe human activity is responsible for global warming?" Similarly, the options provided for answers may not fully express a respondent's opinion (e.g., a simple "yes" or "no" option to the question posed above). Rather, certain answers that may more accurately reflect a respondent's opinion may include, but are not limited to, "no, provided humans are not responsible for global warming", and "yes, assuming experts claim humans are responsible."

Some survey providers may enable users to create and conduct private surveys on pre-selected populations, but since such surveys are private, the results are not available to the general public. Moreover, the survey questions cannot be modified or added by respondents for the purposes of answering survey questions more accurately. As such, the survey questions on a particular subject are static (not dynamic). That is, such surveys cannot not evolve with respondents' curiosity and inquisitiveness.

Survey providers do not enable respondents to modify survey questions and/or responses or add follow-up survey questions and/or answers because such providers would not be able to obtain respondents' answers to specified predetermined static questions. However, if multiple respondents in a population choose to modify the same survey questions and/or responses in a certain way, or to add a new follow-up question and/or response, this may indicate that the modified question is a more appropriate question to ask, and/or the modified and follow-up question(s) and/or responses may allow each respondent to express his/her opinion more accurately.

As such, certain online surveys may prevent respondents from fully expressing opinions because the survey questions and answers may not be appropriately phrased to enable a genuine or accurate response. In addition, free text comment postings are difficult to aggregate into a composite response and may have little or no value since statistical inferences about the population may be difficult or impossible to obtain.

Thus, if an individual is interested in finding statistically meaningful, current, dynamic, and/or reliable opinions on any subject must rely on websites that have difficult to aggregate comments and reviews, stale and static surveys, a limited respondent pool, and questionable results authenticity. The present disclosure provides an interface (e.g., via a website) that one or more members of the general public can access to find public opinions as responses to structured survey questions on any topic and subject matter and/or conduct their own surveys on subject matters of their own interest. In addition, the present disclosure provides general public opinion that is updated in real time and/or allow the surveys to evolve dynamically in such a manner that reflects the public's interests, inquisitiveness, and curiosity.

As will be apparent from the present disclosure, the systems and methods described herein generally improve the functionality of a computing device by allowing it to more accurately provide surveys to users than was previously possible (i.e., provide surveys that are more relevant to a user) and/or more accurately provide search results in response to a search request because the systems and methods described herein are particularly configured for the purposes of allowing updates to existing surveys and using the content of existing and updated surveys to produce more pointed search results. In addition, the systems and methods described herein exist solely within the realm of computers and the Internet because non-computer based surveys (e.g., paper surveys and the like) would not be able to provide modification functionality, accurate searching abilities, and/or provision to a large audience anywhere in the world.

As used herein, a "user" refers to any individual that interacts with any of the components described herein. As such, the user may be, for example, a person creating a survey, a person responding to a survey, or a person obtaining survey data. In embodiments where the user is a person responding to a survey, the user may be referred to as a "respondent." As such, the terms "user" and "respondent" may be used interchangeably herein.

Figure 1:
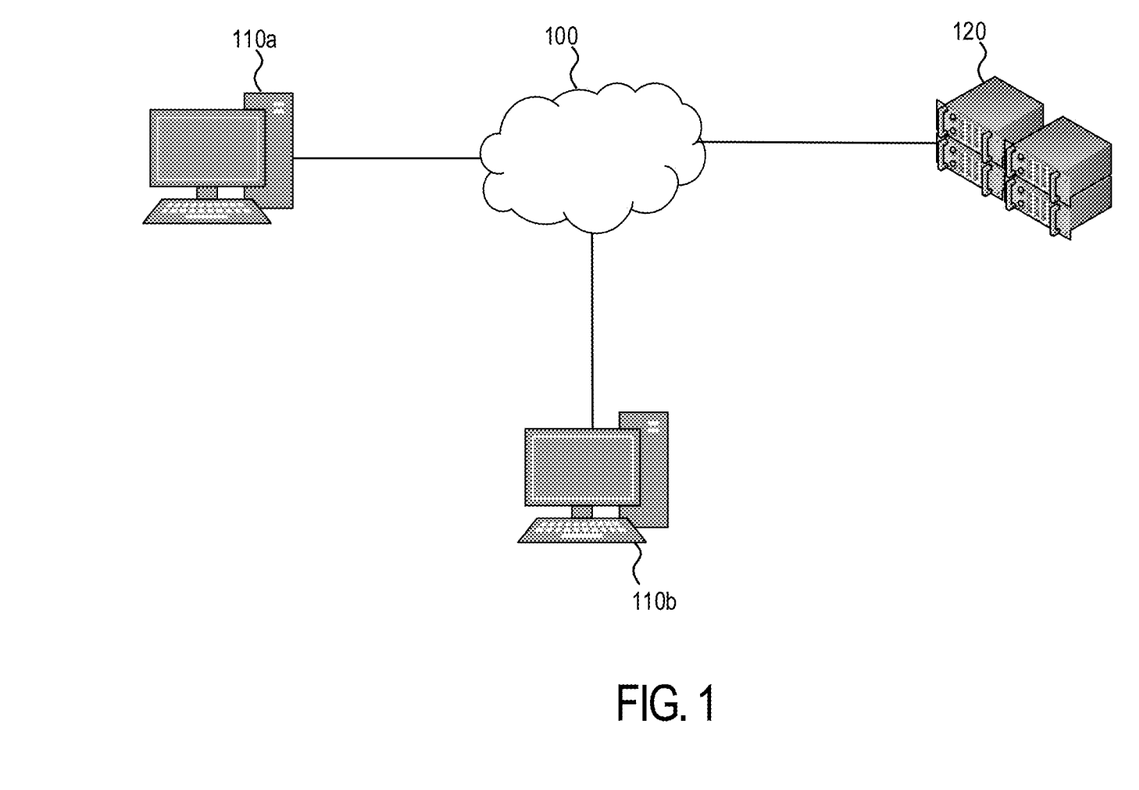
FIG. 1 is a schematic depiction of an illustrative computing network for a system for collecting and/or distributing dynamic survey information according to one or more embodiments shown and described herein.

Referring now to the drawings, FIG. 1 depicts an illustrative computing network that depicts components for a system for collecting and/or distributing dynamic survey information according to embodiments shown and described herein. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a user computing device 110a, a server computing device 120, and an administrator computing device 110b.

The user computing device 110a may generally be used as an interface between a user (e.g., a person creating a survey, a person responding to a survey, a person obtaining survey data, and/or the like) and the other components connected to the computer network 100. Thus, the user computing device 110a may be used to perform one or more user-facing functions, such as receiving one or more inputs from a user or providing information to the user, as described in greater detail herein. Accordingly, the user computing device 110a may include at least a display and/or input hardware, as described in greater detail herein. Additionally, included in FIG. 1 is the administrator computing device 110b. In the event that the server computing device 120 requires oversight, updating, or correction, the administrator computing device 110b may be configured to provide the desired oversight, updating, and/or correction. The administrator computing device 110b may also be used to input additional data into a corpus stored on the server computing device 120 (e.g., a corpus of electronic surveys and/or responses, a corpus of offline surveys and/or responses, or the like).

The server computing device 120 may receive data from one or more sources, store data, index data, search data, and/or provide data to the user computing device 110a in the form of survey questionnaires, survey creation tools, survey modification tools, search results, visual representations, documents, excerpts from documents, and/or the like.

It should be understood that while the user computing device 110a and the administrator computing device 110b are depicted as personal computers and the server computing device 120 is depicted as a server, these are nonlimiting examples. More specifically, in some embodiments, any type of computing device (e.g., mobile computing device, personal computer, server, etc.) may be used for any of these components. For example, the user computing device 110a may be a mobile device upon which the user takes a survey, amends survey questions and/or responses, creates a survey, accesses survey related data, and/or the like. Additionally, while each of these computing devices is illustrated in FIG. 1 as a single piece of hardware, this is also merely an example. More specifically, each of the user computing device 110a, server computing device 120, and administrator computing device 110b may represent a plurality of computers, servers, databases, components, and/or the like.

Figure 2:
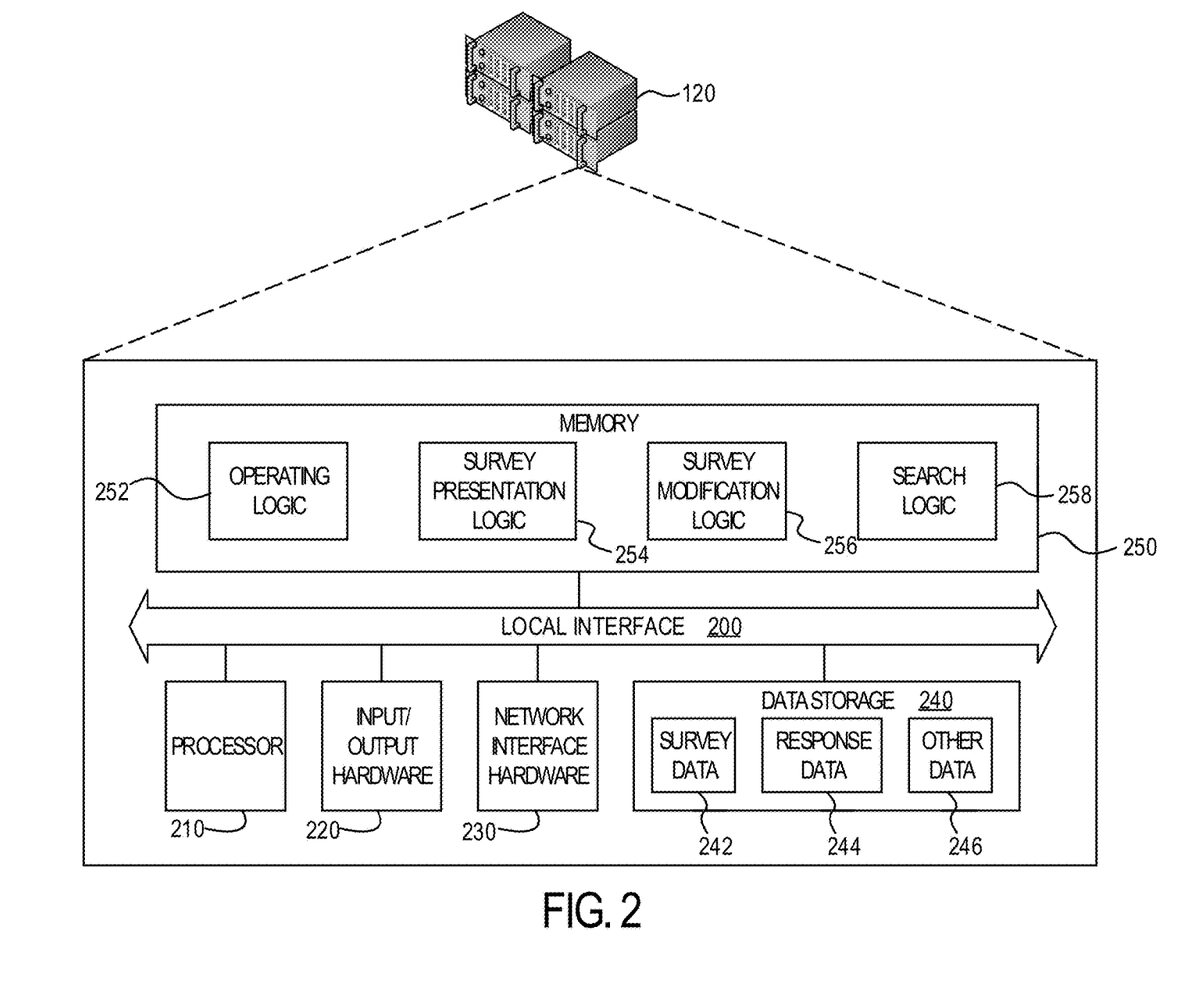
FIG. 2 is a schematic depiction of the server computing device from FIG. 1, further illustrating hardware and software that may be used in collecting and/or distributing dynamic survey information according to one or more embodiments shown and described herein.

FIG. 2 depicts the server computing device 120, from FIG. 1, further illustrating a system for receiving data from one or more sources, storing data, indexing data, searching data, and/or providing data. In addition, the server computing device 120 may include a non-transitory computer-readable medium for searching and providing data embodied as hardware, software, and/or firmware, according to embodiments shown and described herein. While in some embodiments the server computing device 120 may be configured as a general purpose computer with the requisite hardware, software, and/or firmware, in some embodiments, the server computing device 120 may also be configured as a special purpose computer designed specifically for performing the functionality described herein.

As also illustrated in FIG. 2, the server computing device 120 may include a processor 210, input/output hardware 220, network interface hardware 230, a data storage component 240 (which may store survey data 242, response data 244, and other data 246 such as user demographic data), and a non-transitory memory component 250. The memory component 250 may be configured as a volatile and/or a nonvolatile computer-readable storage medium and, as such, may include random access memory (including SRAM, DRAM, and/or other types of random access memory), flash memory, registers, compact discs (CD), digital versatile discs (DVD), and/or other types of storage components. Additionally, the memory component 250 may be configured to store various processing logic, such as operating logic 252, survey presentation logic 254, survey modification logic 256, and/or search logic 258 (each of which may be embodied as a computer program, firmware, or hardware, as an example). A local interface 200 is also included in FIG. 2 and may be implemented as a bus or other interface to facilitate communication among the components of the server computing device 120.

The processor 210 may include any processing component configured to receive and execute program instructions (such as from the data storage component 240 and/or memory component 250). The input/output hardware 220 may include a monitor, keyboard, mouse, printer, camera, microphone, speaker, touch-screen, and/or other device for receiving, sending, and/or presenting data. For example, in some embodiments, the input/output hardware may receive one or more user inputs such as modifications questionnaire questions and/or answers. In some embodiments, the input/output hardware 220 may also include a display that displays information to a user. For example, the display may display survey questions to a respondent, search results to a user, a modification interface, a searching interface, and/or the like. The network interface hardware 230 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 240 may reside local to and/or remote from the server computing device 120 and may be configured to store one or more pieces of data and selectively provide access to the one or more pieces of data. As illustrated in FIG. 2, the data storage component 240 may store survey data 242, response data 244, and/or other data 246, as described in greater detail herein.

Included in the memory component 250 are the operating logic 252, the survey presentation logic 254, the survey modification logic 256, and/or the search logic 258. The operating logic 252 may include an operating system and/or other software for managing components of the server computing device 120. The survey presentation logic 254 may generate surveys, provide surveys to one or more users, receive one or more survey inputs (e.g., responses), and/or aggregate survey data. The survey modification logic 256 may receive modification inputs from one or more users, modify surveys, provide modified surveys to one or more users, receive one or more modified survey inputs (e.g., modified responses), provided modifications to users for approval, and/or aggregate modified survey data. The search logic 258 may be configured to generate search queries from a user input within the graphical user interface.

It should be understood that the components illustrated in FIG. 2 are merely illustrative and are not intended to limit the scope of this disclosure. More specifically, while the components in FIG. 2 are illustrated as residing within the server computing device 120, this is a nonlimiting example. In some embodiments, one or more of the components may reside external to the server computing device 120. Similarly, while FIG. 2 is directed to the server computing device 120, other components such as the user computing device 110a and the administrator computing device 110b may include similar hardware, software, and/or firmware.

Figure 3:
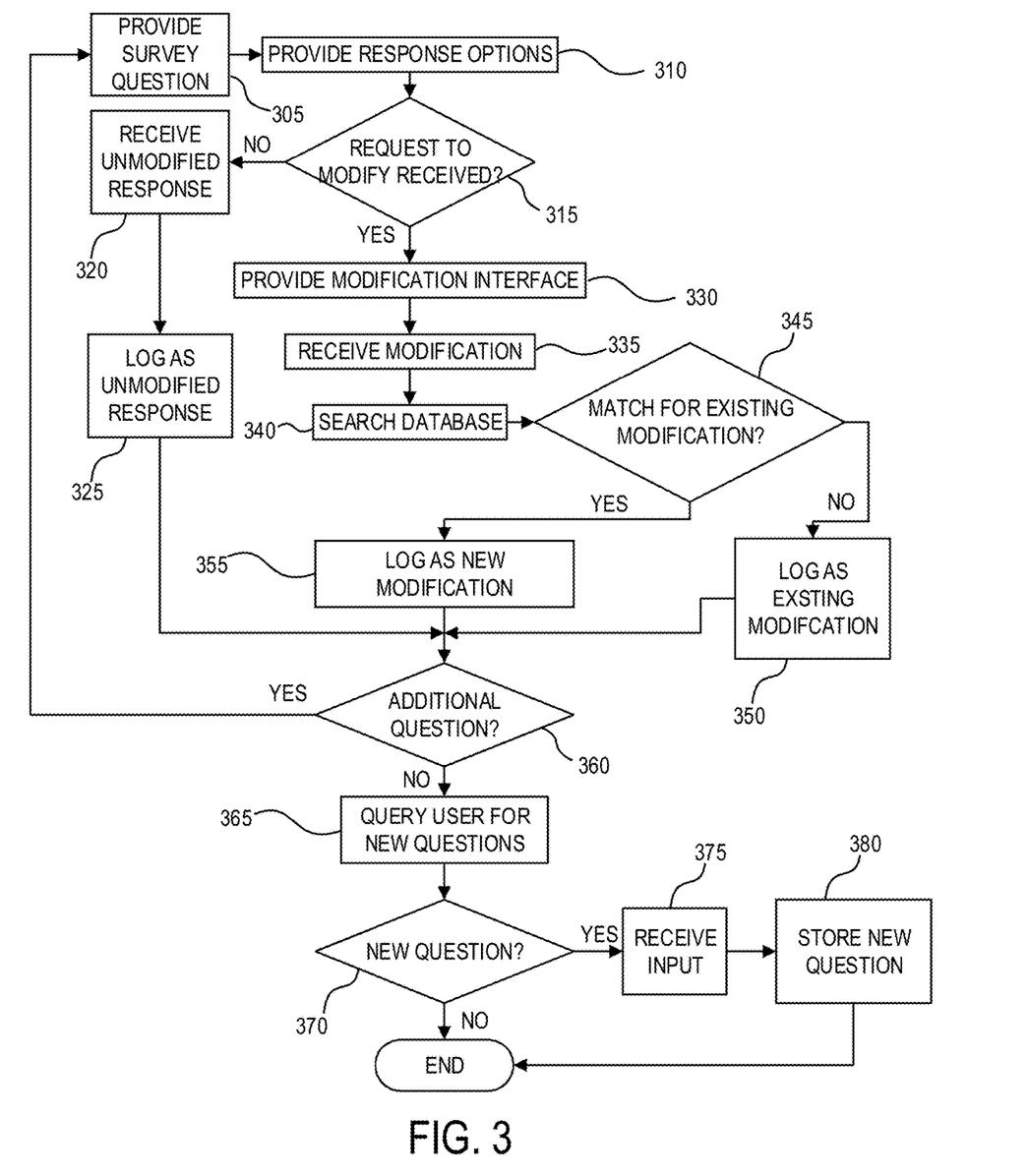
FIG. 3 depicts a flow diagram of an illustrative method of providing a dynamic survey and receiving responses according to one or more embodiments shown and described herein.

FIG. 3 depicts a block diagram of an illustrative method of providing a dynamic survey and receiving responses thereto according to an embodiment. The method described with respect to FIG. 3 may generally be carried out on a network (e.g., the Internet) via a website, a mobile app, or the like. However, it should be understood that the method is not solely limited to network-based activities, and may be carried out in other manners without departing from the scope of the present disclosure. In addition, certain logic may be used to carry out the various processes, such as, for example, the survey presentation logic 254 and the survey modification logic 256 (FIG. 2).

According to the method described herein with respect to FIG. 3, a survey is generally provided to a user and one or more inputs are received from the user. As will be apparent from the description provided below, a survey includes a questionnaire (e.g., a set of one or more structured questions and corresponding preselected choices for answers). A survey question is a linguistic expression used to make a request from a respondent for a response selected from the one or more choices for answers. As will be described in greater detail herein, the responses from respondents are statistically aggregated to produce a composite survey response (or survey results).

A survey question is provided at step 305. The survey question may be a first question in a plurality of questions, and may be presented, for example, via a user interface. In some embodiments, the survey question may be provided alone at step 305. In other embodiments, the survey question may be provided along with one or more other survey questions at the same time at step 305.

In addition to the survey question, a plurality of response options may also be provided at step 310. That is, each survey question may be provided with a plurality of possible responses that correspond to the survey question. For example, a survey question may be "What is your age?" and the plurality of possible responses may be "18-24 years old," "25-36 years old," "36-50 years old," and "51 years old or older." The possible responses may be selectable by a respondent in a user interface such that the user can select the most appropriate response.

In some embodiments, a survey question may be provided with a free text answer option, where the respondent may be asked to provide an answer written in the respondent's own words. The answer may be a single word, a group of words, or sentence answering the survey question. A textual analysis or semantic tool may be used to analyze the written answer and provide the respondent with potential choice options for rephrasing the answer to a more standardized or structured version, which may be easier to aggregate into a composite survey result.

At step 315, a determination may be made as to whether a request to modify a question and/or a response has been received. That is, an input may be received that indicates that a user desires to modify the question and/or the response (e.g., a user clicks on a "modify" button in a user interface, the user highlights text to be modified, or the like).

If the determination is made that the user does not wish to modify the question and/or an answer (e.g., no indication of an intent to modify is received), an unmodified response may be received at step 320. That is, the input that is received may generally be a user selection of one of the plurality of provided response. Accordingly, the user response is logged at step 325. Logging the user response generally includes storing the response in a survey database (e.g., the survey data 242 and/or the response data 244 of FIG. 2) and/or statistically combining the response with other responses to the same question for the purposes of providing statistical data, as described in greater detail herein. In addition, logging the response in this manner allows for a continually updated body of survey results that is instantly available for use (e.g., viewing aggregated results, etc.).

If the determination is made that that the user does wish to modify the question and/or an answer (e.g., if a question and/or an answer is not found to the user's liking), a modification interface may be provided at step 330. Such a modification interface may be, for example, a portion of the user interface that is particularly structured and/or configured to provide the user with one or more options to modify the question and/or an answer thereto and/or one or more options to submit the modified question and/or answer. For example, the modification interface may include a text box that allows the existing text of the question or answer to be replaced, appended, or the like, a display of a list of selectable options including the modified questions and modified answers previously provided by other users, a text box that may be used to provide additional text (e.g., another answer to a question that is in addition to the existing possible answers), and/or existing text that is modifiable.

At step 335, the modification may be received. That is, an input may be received that corresponds to a modified question and/or a modified answer. The modification generally corresponds to a question and/or an answer that more accurately reflects the respondent's opinion than any of the initially provided questions and/or answers thereto. In addition, the input includes of the user's selected response, which in some embodiments may be the modified answer. Such inputs may be in the form of text entry that supplements or replaces the existing text of the question and/or answer. For example, if the existing answers to a question regarding whether the respondent believes in global warming are "yes" and "no," an illustrative modification that may be received for those answers may be "yes, but not due to human activity." In some embodiments, a modification may not be a change or supplementation of an existing entry, but may rather be a wholly new entry. For example, if a question has two possible responses that do not accurately capture the respondent's opinion, the respondent may opt to provide a third possible response as a modification. In another example, if a series of questions regarding a particular subject do not accurately depict the respondent's opinion, the modification may be made to accurately provide the respondent's opinion. In some embodiments, the modification may only be a modified existing response or a wholly new response. That is, in instances where the modification is a wholly new response, the respondent is not provided with an ability to select an "other" option (or the like) and enter clarifying text in a provided text box. Rather, the wholly new response involves the respondent indicating that a wholly new response is entered (either by adding another response option, bullet point, check box or the like) and typing in the wholly new response. As such, the modification is not merely an open-ended option.

The modification may be added to the survey and stored in a survey database so that other users can find, view, and respond to the modification upon searching the database, as described in greater detail herein. The modification may also be linked the original question and/or answers such that the modification is cross referenced with the original question and/or answers.

To ensure that the modification is appropriately added and stored, the database may be searched at step 340 and a determination may be made at step 345 as to whether the modification is a match to an existing modification that was previously made and entered in the database. That is, a determination is made at step 345 by searching the database for text that corresponds to the modified text. The search may include searching for modifications that are an exact match as well as modifications that are substantially similar (e.g., contain different spellings, different punctuation, semantic similarities, or the like). As such, this step may avoid multiple duplicate modifications to the same question and/or answer.

If the modified text is a match for a modification stored in the database (e.g., an exact match or a substantially similar match), the modification may be logged as an existing modification at step 350. That is, rather than logging the modification as a separate entry from other similar/substantially similar modifications in the database, the existing entry in the database may be appended with an indicator. In some embodiments, such an indicator may be a count of the number of times that the same modification has been inputted for the purposes of statistical analysis (e.g., how often a particular modification is made, etc.). In some embodiments, such an indicator may include a variation (e.g., to account for variations in spelling, variations in punctuation, variations in semantically similar terms/phrases, and/or the like).

If the modified text is not a match for a modification stored in the database, the modification may be logged as a new modification at step 355. That is, a new entry is created for the modification, which can be used for comparison with future modifications, for statistical analysis, and/or the like.

At step 360, a determination may be made as to whether an additional question exists for the survey that has not yet been answered. For example, such a determination may include determining that the respondent has not yet reached the end of the survey, that the respondent has not responded to a particular question, that the respondent has requested to move on to the next (or any other) question, and/or the like. If an additional question exists, the process may return to step 305. In some embodiments, additional questions may include additional or modified questions previously provided by other users.

In some embodiments, the respondent may be queried at step 365 as to whether he or she wishes to create an additional question for the survey. For example, a user may determine that the survey is incomplete, fails to ask a particular question, does not cover a particular subject, and/or the like, and may wish to supply proposed questions to be added to the survey. The query may be, for example, a pop-up notification that is provided via the user interface once the user has answered all of the questions, a clickable button that the user may select at any point while responding to the survey, and/or the like.

At step 370, a determination may be made as to whether the user wishes to enter a new question and corresponding answers thereto. That is, the determination may be made as to whether a user clicks on a button to provide a new question, whether the user responds in the affirmative to a query, and/or the like. If the user does not wish to enter a new question, the process may end.

If the determination is that a user does wish to enter a new question for the survey, the user input may be received at step 375. The user input may include the question and a plurality of corresponding answers to the question. In addition, the input may also receive the user's selected response from the plurality of answers. The new question and the corresponding new answers thereto (as well as the user's selected response, if any) is stored at step 380 as being appended to the survey. In some embodiments, the question and the answers may be reviewed and approved before the question is appended to the survey. For example, the question may be provided to one or more additional users for a determination of whether the question should be appended to the survey, may be provided to an administrator user (e.g., a user of the administrator computing device 110*b* of FIG. 1), and/or the like. If the question and the answers are approved, they may be appended to the survey. If the question and the answers are denied, they may not be appended to the survey. The question and the answers may be further modifiable before they are appended to the survey. That is, one or more users may modify any portion of the question and/or the answers, provide additional possible answers, and/or the like. The question and the corresponding answers may then be stored at step 380. The question and/or the corresponding answers may be stored, for example, within the survey data 242 (FIG. 2).

Figure 4:
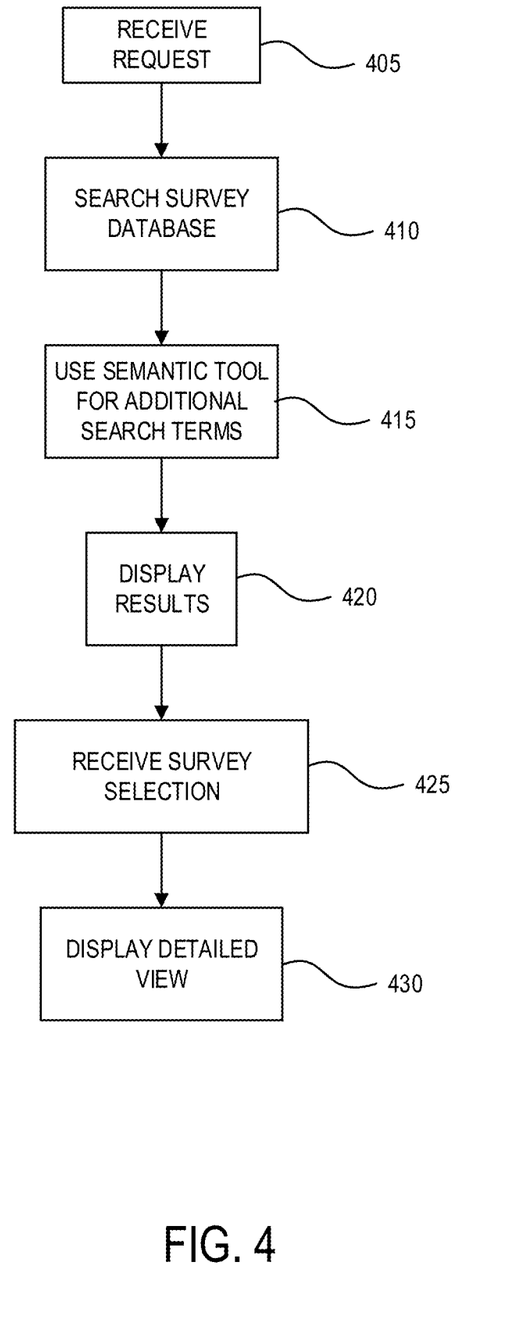
FIG. 4 depicts a flow diagram of an illustrative method of searching and obtaining survey data according to one or more embodiments shown and described herein.

The various databases that are used to store survey data obtained according to the method described herein with respect to FIG. 3 may be searchable using the search logic 258 (FIG. 2). The flow diagram of FIG. 4 depicts one such illustrative method of searching and obtaining survey data according to an embodiment. Certain logic may be used to carry out the processes described with respect to FIG. 4, such as, for example, the search logic 258 (FIG. 2).

Users who wish to find survey results and/or respond to a survey on a particular subject may submit a request for information, which is received at step 405. For example, a request may be received via a submission whereby an input that includes language or search expressions are provided via a user interface (e.g., in a search field). Illustrative examples of inputs that may be received include, but are not limited to, such a survey question of interest, a subject matter, a related keyword or object (such as images or sounds), a predetermined survey identifier such as a code, and the like.

At step 410, the survey database may be searched to find language or other indicia matching the search expressions. In some embodiments, a semantic tool (e.g., a thesaurus or the like) may be used to find additional survey matches at step 415. One or more search results that include matching surveys, including the questions and/or answers thereof, may be displayed to a user at step 420. In some embodiments, the results may be displayed in an order selected by the user. For example, the results may be displayed in order of decreasing number of respondents or by age of the survey. At step 425, a selection of a particular survey may be received as an input. Thus, at step 430, additional details regarding the selected survey may be provided.

In an illustrative example, the user may type "global warming" in a search field. Upon clicking the search button, the one or more survey databases are searched for survey questions and answers containing the words "global warming," any other similar words, and/or related phases such as "climate change" or "carbon footprint." The search results are then provided, which indicate surveys matching the search criteria in the order selected by the user, such as search words match accuracy, or by number or respondents to each survey, such that most popular surveys are presented first. The user may then review (e.g., scroll through) the surveys or questions that are displayed, and may optionally choose which survey to view in further detail. Upon selecting a particular survey to view in further detail, questionnaire questions and/or the survey results may be displayed. In some embodiments, the results may be further broken down by demographics such as by gender, age, income, geography, etc.

In some embodiments, survey results from follow-up questions provided by other users and/or questions that have been modified by users other than the original or initial author of the survey may also be displayed. The modified survey questions can be displayed as links to the original survey question so that the user can view how the question evolved. Such links can be displayed, for example, in a parent-child tree configuration.

If the user requests to view surveys in order of number of respondents, and a modified question has more responses than the original question in the survey, then the modified questions may be displayed first. This way, as the questions in the survey evolve, the most relevant questions and results are provided first.

Figure 5:
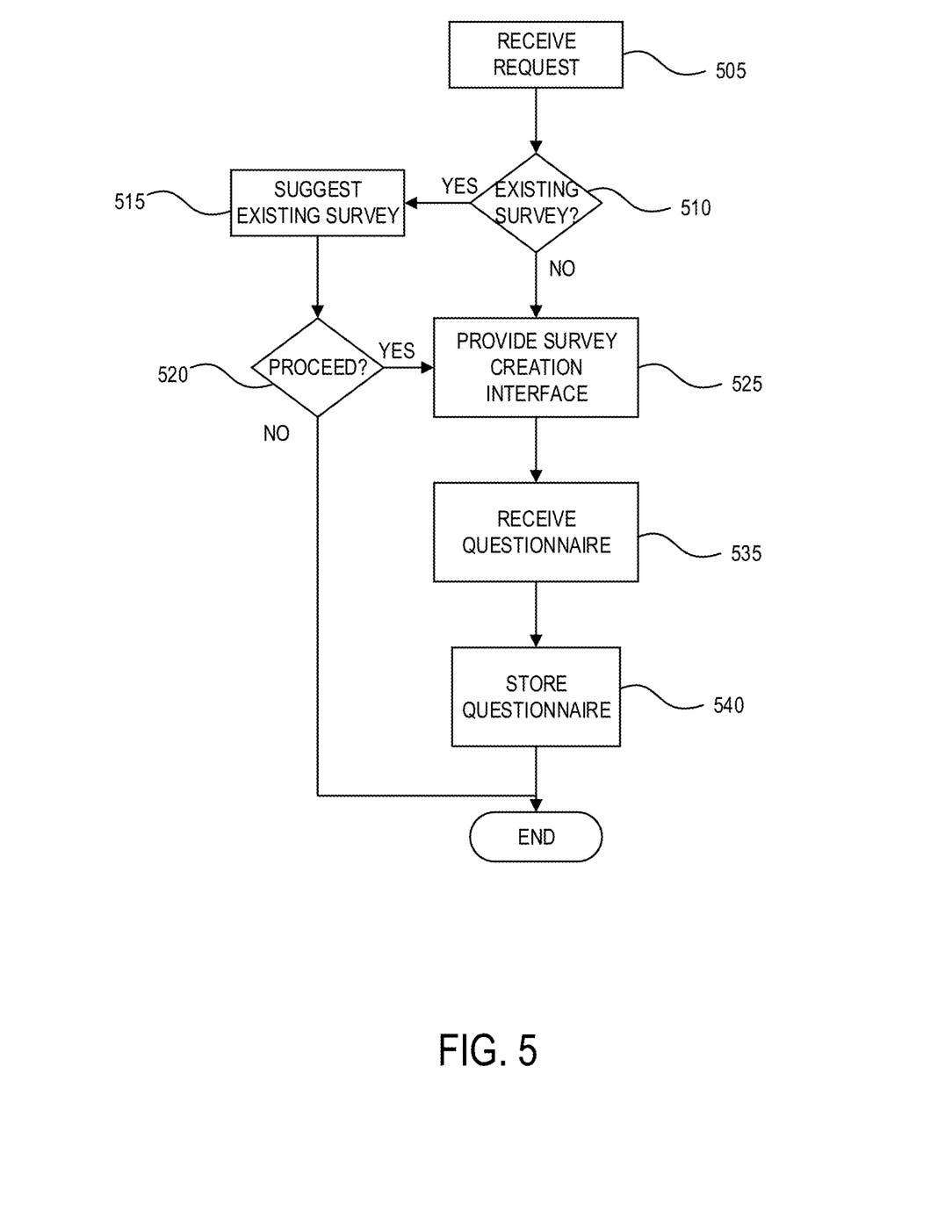
FIG. 5 depicts a flow diagram of a method of creating a new survey according to one or more embodiments shown and described herein.

FIG. 5 depicts a flow diagram of a method for creating a new survey according to an embodiment. Certain logic may be used to carry out the processes as described with respect to FIG. 5, such as, for example, the survey presentation logic 254 and/or the survey modification logic 256 (FIG. 2).

At step 505, a request to create a new survey may be received. The received request may include details regarding a survey (e.g., various terms that describe the survey, a particular topic, and/or the like). To ensure duplicate surveys are not created, a determination may be made at step 510 as to whether one or more existing surveys correspond to the received request. Such a determination may be completed, for example, by conducting a search according to the processes described herein with respect to FIG. 4. If no surveys are found, the process may proceed to step 525. If one or more surveys are found, those surveys may be suggested to the user in lieu of creating a new survey at step 515. A determination may be made at step 520 as to whether the user wishes to proceed with a survey creation or if the user wishes to abandon the request to create a new survey. If the user wishes to abandon the request, the process may end. Otherwise, the process proceeds to step 525.

If the survey creation process proceeds, the user may be provided with one or more tools to create a new survey in which the user will be asked to provide the structured survey questions and choices for answers, as well as the target demographic to whom the survey applies. A survey creating "wizard" or other software may be utilized to help the user design the structured survey questions and choices for answers. As a result of the user's survey creation, the completed survey (e.g., the questionnaire) may be received at step 535.

The new survey questionnaire may be stored in a database as survey data at step 540. As such, other users may be able to find, view, respond, and modify the survey as described herein.

In some embodiments, users may be required to register (or subscribe) in order to create, modify, and respond to surveys, and to have access to previously collected survey results. Registration may require attempting verification that the prospective user is a real person and resides at a physical address, in effect partially verifying users' demographic information. This may be accomplished by the website by mailing a verification card (mailer) to a prospective user at a physical address, where the mailer includes a unique verification code to be entered by the prospective user to complete the verification process. Usage may be restricted if the user has not been verified.

Registration may also enable record keeping of the surveys that have been created, modified, responded, and viewed by each registered user, as well as the history of responses to each survey. Thus, once registered, users can update their previous survey answers or provide new survey information as their opinions evolve. The user registration information can be stored in a user registration database which can be part of the survey database or a separate database for security reasons.

Users may be required to respond to a survey questionnaire in order to have access to previously collected survey results. The survey questionnaire that the user responds to relates to any subject, including, but not limited to, products or services (e.g., rate a car or hotel), preferences (e.g., for a presidential candidate), opinions (e.g., should abortion be legal?), behavior (smoking and alcohol use), or factual information (e.g., income).

Thus in the present disclosure, one incentive for a potential respondent to answer a survey questionnaire on subject is to access previously collected survey results on a different subject. Generally, it is expected that the specific subject of the survey results sought by a person will be different from the specific subject of the survey that person responds on the website.

It should now be understood that the systems and methods described herein can be used to provide a dynamic survey to users, where the dynamic surveys can be updated by the users to accurately reflect a particular user's opinions. More specifically, a survey can be modified by a user such that a question and/or an associated response accurately reflects the user's opinion. Such a dynamic survey may be searchable in a database of survey responses in real time, which allows for up-to-date data regarding particular opinions. In addition, the systems and methods described herein may provide functionality for searching for surveys and creation of new surveys.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of dynamically creating and modifying a survey via a graphical user interface on a website, the method comprising:
    accessing, by a processing device, a database having a memory storing one or more surveys, each of the one or more surveys having first survey questions each of the first survey questions having selectable first answer options;
    receiving, via the graphical user interface on the website, a user input requesting a first survey within the database;
    accessing, by the processing device, a semantic tool to find additional matching surveys based on the user input;
    presenting, via the graphical user interface, a survey matching the user input and the additional matching surveys, including the first survey questions, each of the selectable first survey questions having selectable first answer options including a question modification option, an answer provision option and an answer modification option;
    receiving, via the graphical user interface, a user response to the first survey questions, wherein the user response includes one or more of: selecting the question modification option, selecting the answer provision option and selecting the answer modification option;
    uploading, by the processing device, the user response to the first survey questions to the database; and
    dynamically modifying, by the processing device, the first survey by appending the user response to the first survey questions, including statistically aggregating, by the processing device, the user responses to produce updated survey results; and
    updating, by the processing device, the first survey with an additional one of an existing response and a second new response, wherein the dynamically altered first survey is provided to subsequent users via the graphical user interface on the website, and wherein a number of existing responses and second new responses to the first survey questions determines an order and content of the first survey questions in the dynamically altered first survey when displayed to subsequent users.

2. The method of claim 1 wherein receiving, via the graphical user interface, a user response further includes:
    receiving, by the processing device, an input corresponding to a new question and one or more corresponding new answer choices for the new question;
    receiving, by the processing device, a selection of one or more of the new answer choices; and
    selectively appending, by the processing device, the user response to the first survey.

3. The method of claim 2 wherein selectively appending, by the processing device, the user response to the first survey further includes:
    receiving, by the processing device, a modification of one or more of the selectable first answer options, including receiving an answer that more accurately reflects an opinion of the respondent than the selectable first answer options.

4. The method of claim 3 wherein selectively appending, by the processing device, the user response to the first survey further includes:
    searching the database for previous responses to the question modification option, the answer provision option, and the answer modification option; and
    when the user response matches an existing response from the previous responses to the question modification option, the answer provision option and the answer modification option, logging by the processing device, the user response in the database as an additional one of the existing responses to the question modification option, the answer provision option and the answer modification option.

5. The method of claim 4 wherein when the user response does not match an existing responses from the previous responses to the question modification option the answer provision option and the answer modification option, logging, by the processing device, the user response in the database as a second new response.

6. The method of claim 1 wherein dynamically modifying the first survey further includes:
statistically aggregating, by the processing device, the user responses to produce updated survey results in a batch process; and
updating, by the processing device, the first survey with the additional one of the existing responses and second new responses.

7. The method of claim 6 further comprising:
statistically aggregating, by the processing device, the user responses to produce updated survey results in real time;
receiving, by the processing device, a request for updated survey results; and
providing, via the graphical user interface on the website, updated survey results to website users.

8. The method of claim 6 further comprising:
providing, via the processing device and the graphical user interface, the updated survey results by presenting updated first survey questions from user selected surveys in the order of one or more of: a quantity of existing responses to the first survey questions, a quantity of second new responses to the first survey questions, a quantity of responses to the answer provision option with matching answer selections.

9. The method of claim 1 wherein receiving, via the graphical user interface, a user response to the first survey questions further includes:
receiving one or more text inputs to the graphical user interface, the one or more text inputs supplementing or replacing an existing text of at least one of the first survey questions and the selectable first answer options.

10. The method of claim 1 further comprising:
accessing, via the graphical user interface and the processing device, a survey creation tool on the website to create a survey;
receiving, by the processing device, survey characteristics including structured survey questions, answer choices, and target demographic information from a survey creator user accessing the survey creation tool;
searching, by the processing device, the database for questions and answer information from prior surveys matching the survey characteristics and the additional matching surveys;
extracting, by the processing device, questions and answer information from prior surveys that match the survey and the additional matching surveys; and
offering to the survey creator user, via the graphical user interface and the processing device, the questions and answer information from prior surveys having similarly structured survey questions, answer choices, and demographic information.

11. An online survey system for providing a dynamic survey via a graphical user interface on a website, the system comprising:
a processing device; and
a non-transitory, processor-readable storage medium, the non-transitory processor-readable storage medium comprising one or more programming instructions that, when executed, cause the processing device to:
access a database having a memory storing one or more surveys, each of the one or more surveys having first survey questions;
receive, via the graphical user interface on the website, a user input requesting a first survey within the database;
access a semantic tool to find additional matching surveys based on the user input;
present, via the graphical user interface, a user selected survey matching the user input and the additional matching surveys, including the first survey questions, each of the survey questions having selectable first answer options including a question modification option, an answer provision option, and an answer modification option;
receive, via the graphical user interface, a user response to the first survey questions, wherein the user response includes one or more of: selecting the question modification option, selecting the answer provision option, and the selecting the answer modification option;
upload the user response to the first survey questions to the database; and
dynamically modify the first survey based on the user response to the first survey questions, including statistically aggregating the one or more user responses to produce updated survey results, wherein the dynamically altered first survey is provided to subsequent users via the graphical user interface on the website, and wherein a quantity of existing responses and second new responses to the first survey questions determines an order and content of the first survey questions in the dynamically altered first survey when displayed to subsequent users.

12. The online survey system of claim 11 wherein the non-transitory processor-readable storage medium further includes one or more programming instructions that, when executed, cause the processing device to:
receive an input corresponding to a new question and one or more corresponding new answer choices for the new question;
receive, by the processing device, a selection of one or more of the new answer choices; and
selectively append the user response to the first survey by:
receiving a modification of one or more of the selectable first answer options, including:
receiving an answer that more accurately reflects an opinion of the respondent than the selectable first answer options.

13. The online survey system of claim 12 wherein the non-transitory processor-readable storage medium further includes one or more programming instructions that, when executed, cause the processing device to:
search the database for previous responses to the question modification option, the answer provision option, and the answer modification option;
when the user response matches an existing response from the previous responses to the question modification option, the answer provision option, and the answer modification option, log by the processing device, the user response in the database as an additional one of the existing responses; and
when the user response does not match an existing response from the previous responses to the question modification option, the answer provision option, and the answer modification option, log, by the processing device, the user response in the database as a second new response.

14. The online survey system of claim 13 wherein the non-transitory processor-readable storage medium further includes one or more programming instructions that, when executed, cause the processing device to dynamically modify the first survey further by:
   statistically aggregate the one or more user responses to produce updated survey results in real time, or by a batch process; and
   update the first survey with the additional one of the existing responses and second new responses.

15. The online survey system of claim 14 wherein the non-transitory processor-readable storage medium further includes one or more programming instructions that, when executed, cause the processing device to:
   receive a request for updated survey results; and
   provide, via the graphical user interface on the website, updated survey results to website users.

16. The online survey system of claim 14 wherein the non-transitory processor-readable storage medium further includes one or more programming instructions that, when executed, cause the processing device to:
   provide the updated survey results by presenting updated first survey questions from user selected surveys in the order of one or more of: a quantity of existing responses to the first survey questions, a quantity of second new responses to the first survey questions, and a quantity of responses to the answer provision option having matching answer selections.

17. The online survey system of claim 11 wherein the non-transitory processor-readable storage medium further includes one or more programming instructions that, when executed, cause the processing device to:
   provide a survey creation tool on the website to create a survey;
   receive survey characteristics including structured survey questions, answer choices, and target demographic information from a survey creator user accessing the survey creation tool;
   search the database for questions and answer information from prior surveys matching the survey characteristics;
   extract questions and answer information from prior surveys that match the survey characteristics; and
   offer to the survey creator user the questions and answer information from prior surveys having similarly structured survey questions, answer choices, and demographic information.

18. A computing system that provides a dynamic online survey via a graphical user interface on a website, the computing system comprising:
   input/output hardware that:
   receives user input including search criteria from a user requesting a survey;
   accesses a semantic tool to find additional matching surveys based on the user input;
   searches a database for survey questions matching the search criteria from the user input;
   provides first survey questions via the graphical user interface on the website, including a modification of at least one of the first survey questions, wherein the modification corresponds to a revised question that more accurately reflects an opinion of a respondent than the first survey questions;
   processing logic that:
   accesses, via a processing device in electronic communication with the website, the database, the database having a memory storing one or more surveys, each of the one or more surveys having first survey questions;
   receives, via the graphical user interface on the website, a user input selecting a first survey within the database;
   receives, by the graphical user interface on the website, a user input corresponding to a new question and one or more corresponding new answer choices for the new question;
   searches the database for previous responses to the question modification option and the answer modification option, and when the user response matches an existing response from the previous responses to the question modification option and the answer modification option, logs, by the database, the user response in the database as an additional one of the existing responses, and when the user response does not match an existing responses from the previous responses to the question modification option and the answer modification option, logs, by the processing device, the user response in the database as a second new response;
   receives, by the processing device, a selection of the one or more new answers; and
   provides, by the processing device, the new question and the corresponding new answer or answers to one or more users for approval;
   presents, via the graphical user interface, a user selected survey matching the user input and the additional matching surveys, the survey including the first survey questions, each of the survey questions having selectable first answer options including a question modification option and an answer modification option;
   receives, via the graphical user interface, a user response to the first survey questions, wherein the user response includes one or more of: selecting the question modification option and the selecting the answer modification option;
   uploads, by the processing device, the user response to the first survey questions to the database;
   dynamically modifies, by the processing device, the first survey based on the user response to the first survey questions by:
   statistically aggregating, by the processing device, the one or more user responses to produce updated survey results in real time, or by a batch process;
   presenting, via the graphical user interface and the processing device, the updated survey results in the order and content of one or more of: a quantity of existing responses to the first survey questions, a quantity of second new responses to the first survey questions, a quantity of responses to the answer provision option to be defined with matching answer selections; and
   provides, via the graphical user interface and the processing device, the dynamically altered first survey to subsequent users; and
   a display that displays the graphical user interface with the first survey questions to the respondent.

19. The computing system of claim 18 wherein the processing logic further:
   selectively appends the user response to the first survey by:
   receiving a modification of the selectable first answer options, including:
   receiving an answer that more accurately reflects an opinion of the respondent than the selectable first answer options.

20. The computing system of claim 18 wherein the processing logic further:
- accesses a survey creation tool on the website to create a survey;
- receives survey characteristics including structured survey questions, answer choices, and target demographic information from a survey creator user accessing the survey creation tool;
- searches the database for questions and answer information from prior surveys matching the survey characteristics;
- extracts questions and answer information from prior surveys that match the survey characteristics; and
- offers to the survey creator user the questions and answer information from prior surveys having similarly structured survey questions, answer choices, and demographic information.

* * * * *